(Model.)

J. F. McCONNELL.
FELLY COUPLING.

No. 370,076. Patented Sept. 20, 1887.

Witnesses
Geo. Thorpe
O. E. Doyle

Inventor
James F. McConnell
By his Attorneys,
C. A. Knowles

UNITED STATES PATENT OFFICE.

JAMES FRANCIES McCONNELL, OF CHICO, CALIFORNIA.

FELLY-COUPLING.

SPECIFICATION forming part of Letters Patent No. 370,076, dated September 20, 1887.

Application filed April 18, 1887. Serial No. 235,233. (Model.)

*To all whom it may concern:*

Be it known that I, JAMES FRANCIES McCONNELL, a citizen of the United States, residing at Chico, in the county of Butte and State of California, have invented new and useful Improvements in Felly-Couplings, of which the following is a specification.

My invention relates to improvements in felly-couplings, having for its object the provision of means whereby the felly may be tightened when it becomes loose without removing the tire and cutting and rewelding the same. I attain the said object in the device hereinafter described, claimed, and illustrated in the accompanying drawings, in which—

Figure 1:
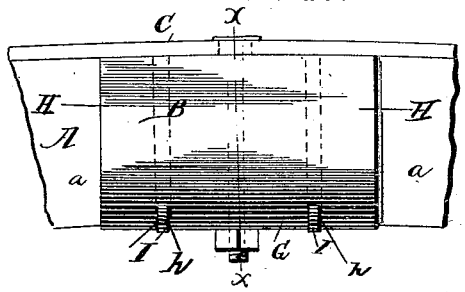
Figure 2:
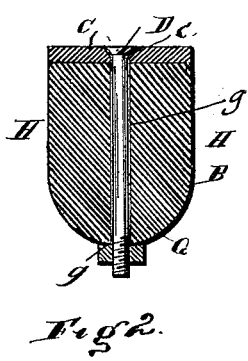
Figure 3:
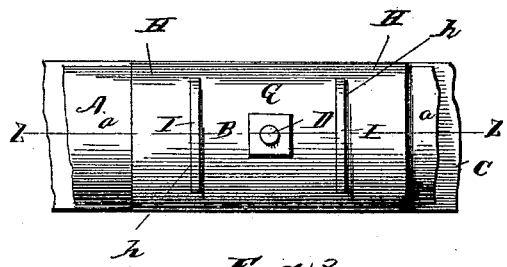
Figures 4, 5:
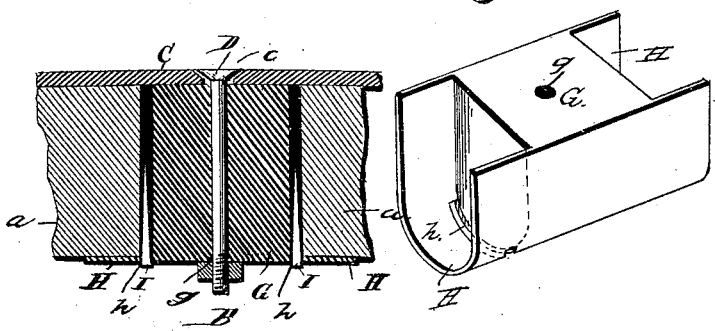

Figure 1 represents a portion of a wheel having my coupling attached thereto. Fig. 2 is a transverse section on the line $x\,x$ of Fig. 1. Fig. 3 is a plan view of the coupling from the interior of the wheel. Fig. 4 is a longitudinal section on the line $z\,z$ of Fig. 3. Fig. 5 is a detail perspective view of the coupling.

Referring to the drawings, in which similar letters denote corresponding parts in all the figures, A designates the felly of the wheel, having the ends $a\,a$ thereof inserted in opposite ends of the coupling B, and C is the tire, having a longitudinal slot, $c$, therein, through which passes the bolt D, which secures the said coupling to the tire. The said coupling comprises a central body, G, having an opening, $g$, therein, through which passes the bolt D, and the integral flanges H H on each end, forming, when the coupling is secured to the tire, sockets to receive the ends of the felly. The said ends are designed to press upon opposite sides of the central body, G, and when the ends of the felly become loose in the sockets, by shrinkage or otherwise, wedges I are driven between the ends thereof and the body G of the coupling, the slits $h\,h$ being formed in the said flanges on the inner side of the coupling for this purpose. Thus it will be seen that when the tire becomes loose it may be tightened without the aid of a wheelwright, and quite as effectively and much more quickly than if the tire be removed, cut, and rewelded.

The slot $c$ in the tire, through which the bolt D passes, is designed to allow the coupling a slight longitudinal play or movement when the wedges are driven in, to prevent the said bolt from being broken or bent out of place. It will be seen that when the wedges are securely driven into place and the felly is sprung outwardly against the tire by the force exerted thereby there will not be the slightest play in any direction of any of the parts of the device, as the power of the said wedges to expand the felly to fill the tire is tremendous.

The coupling is preferably made of malleable iron or brass, and it will be seen that it is neat and inconspicuous in appearance, simple in construction, very effective in use, and inexpensive to manufacture.

Having now described my invention, what I claim, and desire to secure by Letters Patent of the United States, is—

The felly-coupling having the body G, integral flanges H H, forming sockets to receive the ends of the felly, and the slits or openings $h\,h$ in the said flanges on the inner side of the coupling, with the inner edges thereof flush with the outer sides of the body G, adapted to have wedges driven therethrough between the ends of the said felly and the said body G, substantially as and for the purpose set forth.

In testimony that I claim the foregoing as my own I have hereto affixed my signature in presence of two witnesses.

JAMES FRANCIES McCONNELL.

Witnesses:
JAS. O. RUSBY,
O. S. JEWETT.